US007370357B2

(12) United States Patent
Sekar (10) Patent No.: US 7,370,357 B2
(45) Date of Patent: May 6, 2008

(54) SPECIFICATION-BASED ANOMALY DETECTION

(75) Inventor: Ramasubramanian Sekar, East Setauket, NY (US)

(73) Assignee: Research Foundation of the State University of New York, Stony Brook, NY (US)

( * ) Notice: Subject to any disclaimer, the term of this patent is extended or adjusted under 35 U.S.C. 154(b) by 1073 days.

(21) Appl. No.: 10/298,826

(22) Filed: Nov. 18, 2002

(65) Prior Publication Data

US 2004/0098617 A1 May 20, 2004

(51) Int. Cl.
G06F 11/00 (2006.01)
(52) U.S. Cl. .............................. 726/23; 726/22; 726/26; 713/188; 709/224
(58) Field of Classification Search ............ 726/23–25, 726/22, 26; 713/188
See application file for complete search history.

(56) References Cited

U.S. PATENT DOCUMENTS

| 6,715,084 B2 * | 3/2004 | Aaron et al. ................... 726/23 |
| 6,742,124 B1 * | 5/2004 | Kilpatrick et al. ............. 726/23 |
| 7,024,694 B1 * | 4/2006 | Ko .............................. 726/23 |
| 2003/0009699 A1 * | 1/2003 | Gupta et al. ................ 713/201 |

OTHER PUBLICATIONS

Anderson, Debra, et al., *Next-Generation Intrusion Detection Expert System (NEDES) A Summary*, SRI International, Computer Science Laboratory, SRI-CSL-95-07, May 1995.
Kumar, Sandeep, *A Pattern Matching Model for Misuse Intrusion Detection*, Department of Computer Sicences, Purdue University, National Computer Security Conference, 1994.
Lee, Wenke, *Data Mining Approaches for Intrusion Detection*, Computer Science Department, Columbia University, USENIX Security Symposium, 1998.
Sekar, R., *Synthesizing Fast Intrusion Prevention/Detection Systems from High-Level Specifications*, State University of New York at Stony Brook, New York, USENIX Security Symposium, 1999.

* cited by examiner

*Primary Examiner*—Nasser Moazzami
*Assistant Examiner*—Fikremariam Yalew
(74) *Attorney, Agent, or Firm*—Frank Chau & Associates, LLC (57) ABSTRACT

A method for network intrusion detection on a network comprising a plurality of state machines for passing a plurality of network packets comprises determining frequency distributions for each transition within each state machine, determining the distributions of values of each state machine on each transition, and comparing the distributions to observed statistics in the network, and upon determining that the observed statistics are outside defined limits, detecting an anomaly.

13 Claims, 5 Drawing Sheets

SPECIFICATION-BASED ANOMALY DETECTION

BACKGROUND OF THE INVENTION

1. Field of the Invention

The present invention relates to anomaly detection in computer networks, and more particularly to a specification-based anomaly detection method for network intrusion detection.

2. Discussion of Related Art

Intrusion detection techniques can be broadly classified into misuse detection, anomaly detection and specification based approaches. Misuse detection, which detects known misuses accurately, is not effective against unknown attacks. Anomaly detection copes better with unknown attacks, but can generate false positives. Specification-based approaches can detect novel attacks, while maintaining a low degree of false alarms.

Misuse detection techniques detect attacks as instances of attack signatures. This approach can detect known attacks accurately. However, it is not effective against previously unseen attacks, as no signatures are available for such attacks.

Anomaly detection overcomes the limitation of misuse detection by focusing on normal system behaviors, rather than attack behaviors. In Anomaly detection, machine learning techniques are used to learn normal behavior by observing system operation during a training phase that is free of attacks. Subsequently, this learnt behavior is compared against observed system behavior during the detection phase, and any deviations are deemed to indicate attacks. Unfortunately, systems often exhibit legitimate but previously unseen behavior, which leads anomaly detection techniques to produce a high degree of false alarms. Moreover, the effectiveness of anomaly detection is affected greatly by what aspects (also called "features") of the system behavior are learnt. The problem of selecting an appropriate set of features has proven to be a hard problem.

Many network intrusion detection systems reconstruct higher level interactions between end hosts and remote users, and identify anomalous or attack behaviors. Other approaches operate on the basis of packet header contents. The reconstructive approaches provide a way to define signatures based on the content of data exchanged in a reconstructed TCP session, whereas the packet-header techniques define signatures in terms of individual packets. The former class of approaches are more effective in detecting application layer attacks, whereas the latter class of techniques can provide better detection of attacks that do not result in valid TCP sessions (e.g., probing attacks) or valid requests at the application level.

Within the area of anomaly detection based approaches, data mining is concerned with the extraction of useful information from large volumes of data. Data mining techniques for intrusion detection rely on expert identification of useful features for network intrusion detection. For example, W. Lee and S. Stolfo, Data Mining Approaches for Intrusion Detection, USENIX Security Symposium, 1998, suggest the selection of a long list of features that include, among many others, the following: successful TCP connection, connection rejection, failure to receive SYN-ACK, spurious SYN-ACKs, duplicate ACK rate, wrong size rate, bytes sent in each direction, normal connection termination, half-closed connections, and failure to send all data packets.

The NATE (Network Analysis of Anomalous Traffic Events) system uses statistical clustering techniques to learn normal behavior patterns in network data. Training data is used in the formation of clusters, or groups, of similar data. During detection, data points that do not fall into some cluster are seen as anomalous. Clustering uses a similarity measure and, for network data, sampling techniques are also needed. NATE can detect most network probes and DOS attacks in the MIT Lincoln Labs data. The technique used by NATE is sensitive to the sampling methodology and distance measure used, so continuing research is involved in trying to develop more accurate methods. NATE uses sampling to select a small subset of packet data for training. Moreover, the information learnt by NATE requires checking by a human before it is used for detection.

The EMERALD system contains a statistical component called eStat. This statistical component maintains short and long-term distribution information for several types of "measures", using a decay mechanism to age out less recent events. While the techniques do not need prior knowledge of attack activity, such knowledge is used in the choice of attributes that constitute measures and time ranges used for intensity measures.

EMERALD also has a component that combines signature and anomaly-based approaches called eBayes. EBayes uses a belief network to determine from a number of features whether the values of those features fits with some normal behavior (http, ftp, etc.), some predefined bad behavior (mailbomb, ipsweep, etc.), or neither of these (other).

Unlike signature or misuse based intrusion detection techniques, anomaly detection is capable of detecting novel attacks. However, the use of anomaly detection in practice is hampered by a high rate of false alarms. Specification-based techniques have been shown to produce a low rate of false alarms, but are not as effective as anomaly detection in detecting novel attacks, especially when it comes to network probing and denial-of-service attacks.

Therefore, a need exists for a system and method of specification-based anomaly detection for network intrusion detection.

SUMMARY OF THE INVENTION

According to an embodiment of the present invention, a method for network intrusion detection on a network comprising a state machines for processing a plurality of network packets comprises determining a state-machine specification for at least one network protocol of interest, and determining at least one statistical property of interest, wherein each statistical property of interest is associated with a property of the state-machine. The method further comprises determining, in a training mode, statistics corresponding to the at least one statistical property of interest, and initializing a detection mode with the statistics corresponding to the at least one statistical property of interest. The method comprises determining observed statistics corresponding to the at least one statistical property of interest in the detection mode according to network packets processed by the state-machines, and comparing the at least one statistical property of interest to the observed statistics corresponding to the at least one statistical property of interest determined in detection mode, and upon determining a significant deviation generating an alarm.

The method stores statistics corresponding to the at least one statistical property of interest determined in training mode.

The network protocol of interest is at least one of Internet Protocol (IP), Transmission Control Protocol (TCP), and Hypertext Transfer Protocol (HTTP).

The statistical property of interest is a frequency distribution with which a transition is taken.

The statistical property of interest is a distribution of a value of at least one state variable.

The alarm further comprises at least one packet field of the network packet and state machine contents.

The method comprises determining a source of an attack, wherein the attack triggered the alarm, determining a destination of the attack, and determining a type of the attack.

The statistical property of interest can be one of whether a particular transition on the state machine is taken by the trace and the value of the particular state variable or a packet filed when a transition is traversed by a trace.

The state-machine specification is rule based.

According to an embodiment of the present invention, a method for network intrusion detection on a network comprising a plurality of state machines for passing a plurality of network packets comprises determining frequency distributions for each transition within each state machine, determining the distributions of values of each state machine on each transition, and comparing the distributions to observed statistics in the network, and upon determining that the observed statistics are outside defined limits, detecting an anomaly.

According to an embodiment of the present invention a program storage device is provided, readable by machine, tangibly embodying a program of instructions executable by the machine to perform method steps for for network intrusion detection on a network comprising a plurality of state machines for passing a plurality of network packets. The method comprising determining frequency distributions for each transition within each state machine, determining the distributions of values of each state machine on each transition, and comparing the distributions to observed statistics in the network, and upon determining that the observed statistics are outside defined limits, detecting an anomaly.

BRIEF DESCRIPTION OF THE FIGURES

Preferred embodiments of the present invention will be described below in more detail, with reference to the accompanying drawings.

DETAILED DESCRIPTION OF PREFERRED EMBODIMENTS

According to an embodiment of the present invention, a system and method for network Intrusion detection combines specification-based and anomaly-based intrusion detection techniques, mitigating the weaknesses of the two approaches while magnifying their strengths. According to an embodiment of the present invention, the combination of anomaly detection and specification-based detection yields unexpected results. For example, attacks that are undetectable using either anomaly detection or specification-based detection alone become detectable using a method of the present invention. Further, the false alarm rate has been determined to be at a low level.

Figure 1:
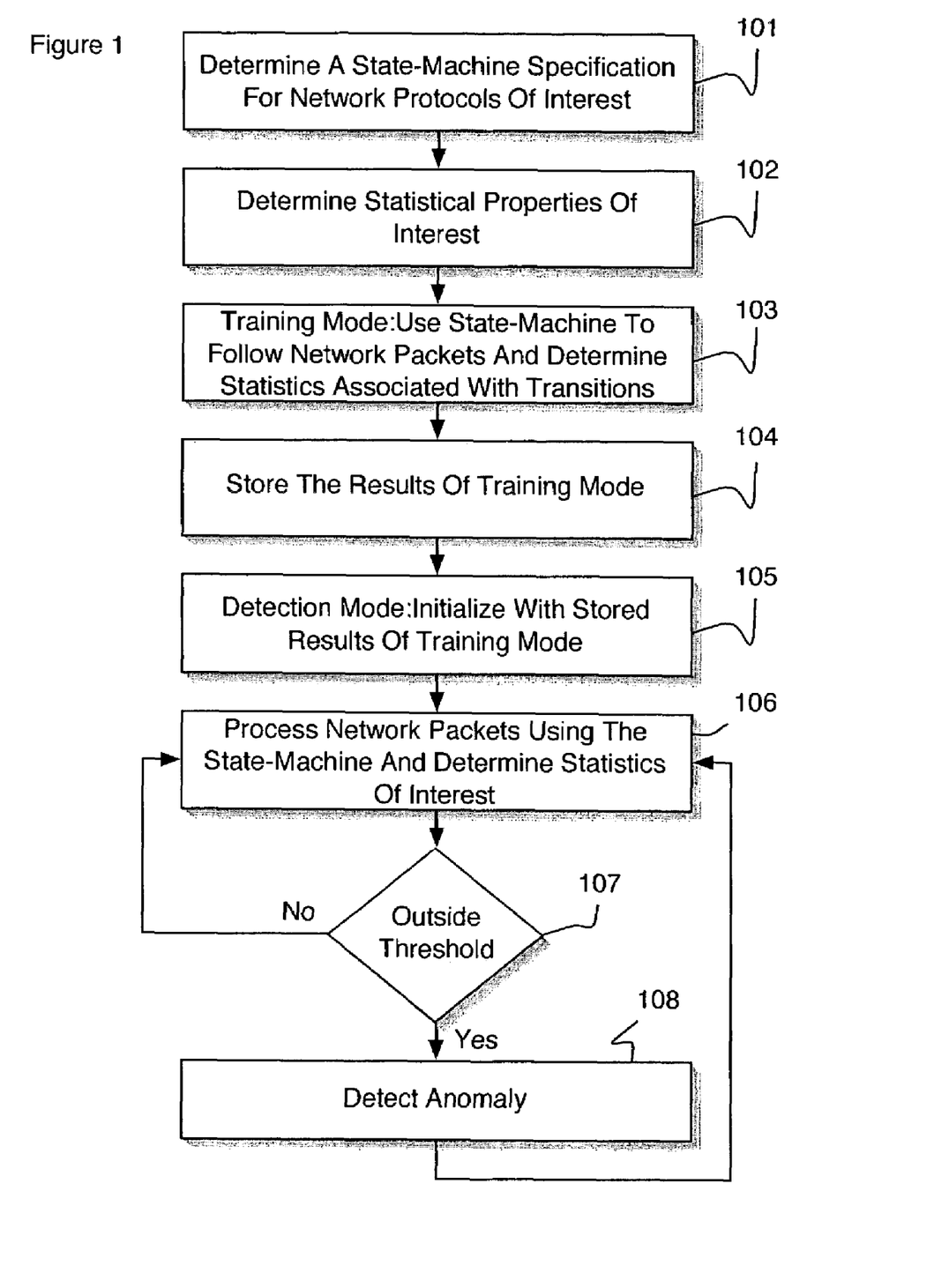
FIG. 1 is a flow chart of a method according to an embodiment of the present invention.

Referring to FIG. 1, a method for network intrusion detection utilizes state-machine specifications of network protocols, augmented with information about statistics that need to be maintained to detect anomalies. A specification language captures the statistical information to be monitored in a succinct manner. On a network comprising state machines for passing a plurality of network packets, a specification can be determined according to known network protocols 101, wherein each specification transforms properties of the network packets into traces. Accordingly, the a state-machine specification for one or more network protocols of interest (IP, TCP, HTTP, etc.) can be developed 101. Statistical properties of interest can be determined, such as frequency distributions with which various transitions are taken, or the distribution of values of the state variables 102. The specifications implicitly map statistical properties of the packet sequences into statistical properties associated with the transitions of the state machine. Frequency distributions for each transition and distributions of values of each state machine on each transition can be determined. That is, the system and/or method can be run in a training mode, wherein the state-machine can be used to follow the processing of network packets. Accordingly, statistics associated with state machine transitions (from block 102) can be determined 103. The results of the training mode can be stored in a memory 104. The system and/or method can be run in a detection mode wherein the system/method can be initialized with the results of the training mode 105. The distributions can be compared to observed statistics in the network. Network packets can be processed using the state-machine and the statistics observed during detection can be determined 106. If the observed statistics are outside defined limits, an anomaly is detected. Whenever a determined statistical property deviates significantly from the same statistic as observed in training mode 107, an alarm can be generated 108. All of the relevant packet fields and state machine contents can be included in the alarm, so that it can be used in identifying the source, destination and/or the nature of an attack.

The effectiveness of a system and method according to an embodiment of the present invention is demonstrated on the 1999 Lincoln Labs intrusion detection evaluation data, where all of the probing and denial-of-service attacks were detected with a low rate of false alarms (less than 10 per day). Whereas feature selection was a crucial step that required a great deal of expertise and insight in the case of previous anomaly detection approaches, the use of protocol specifications according to the present invention simplifies this problem to the point where good detection results can be obtained with little effort in feature selection. Moreover, the machine learning component of the present invention is robust enough to operate without human supervision. It is also and fast enough so that no sampling techniques, which run the risk of missing important statistical information (especially for infrequently occurring phenomena) need to be employed.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2:
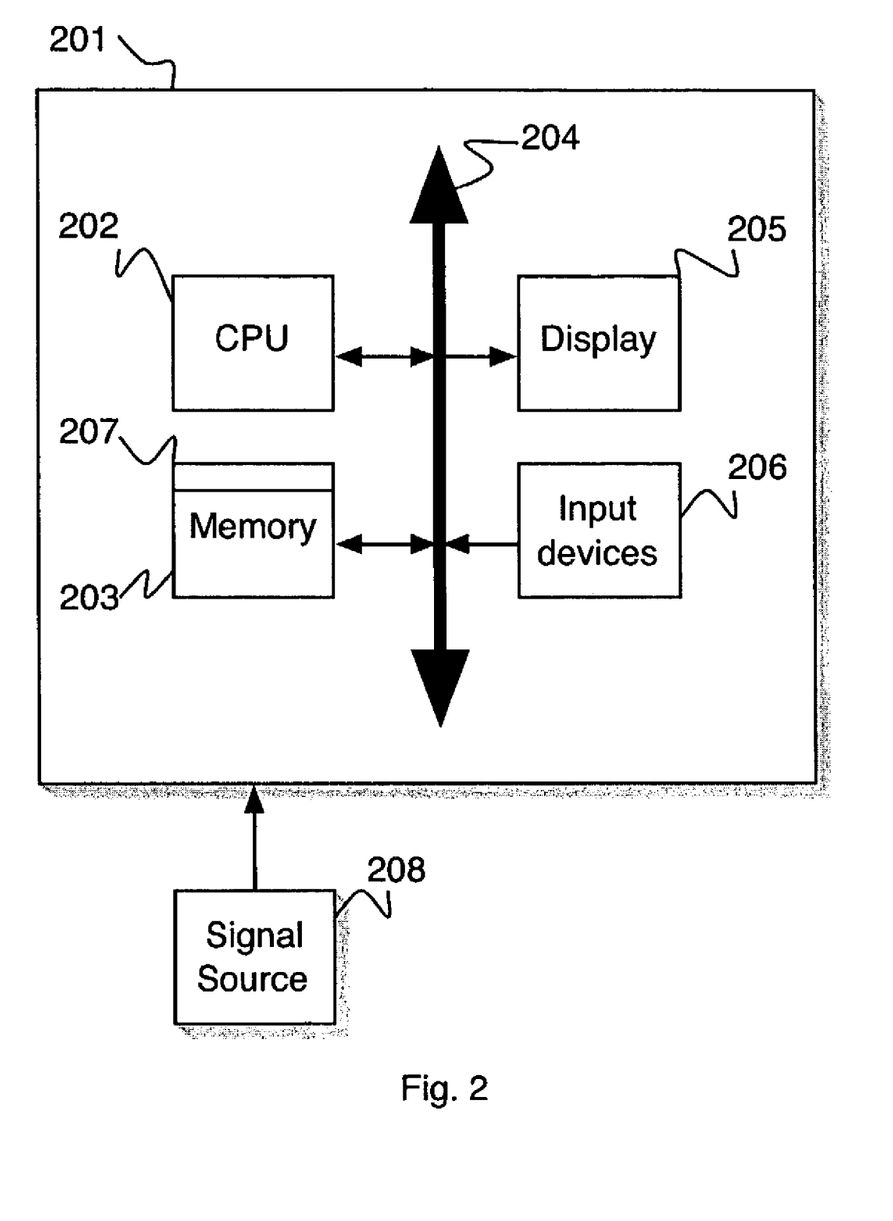
FIG. 2 is a diagram of a system according to an embodiment of the present invention.

Referring to FIG. 2, according to an embodiment of the present invention, a computer system 201 for implementing the present invention can comprise, inter alia, a central processing unit (CPU) 202, a memory 203 and an input/output (I/O) interface 204. The computer system 101 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device. The computer platform 201 also interfaces with a network on which packet data can be captured and/or monitored It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 3:
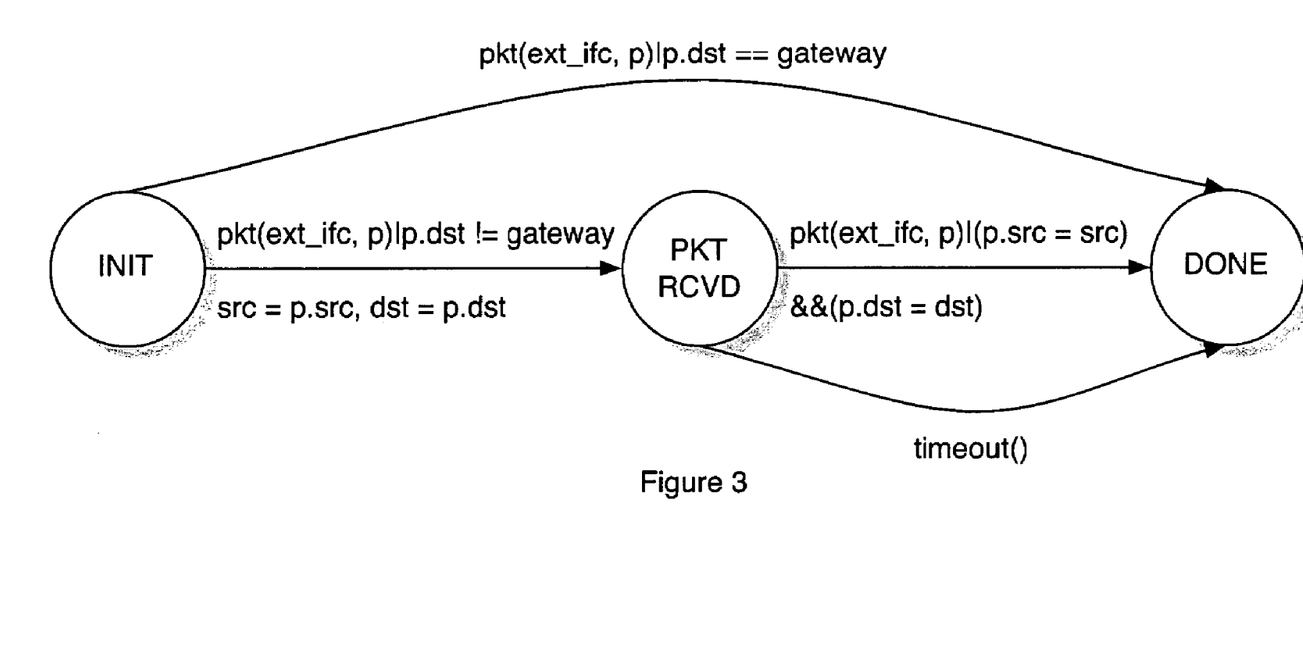
FIG. 3 is a diagram of an IP protocol state machine according to an embodiment of the present invention.

Specifications of hosts and routers, in terms of network packets received or transmitted by them, are derived from network protocol specifications, such as the IP, ARP, TCP and UDP protocols. For example, consider a gateway node that connects an organization's local network to the Internet. FIG. 3 is diagram of a specification characterizing the gateway's behavior, as observed at the IP protocol layer. FIG. 3 incorporates the following simplifications: no IP fragmentation is modeled, and only packets from the Internet (but not those sent to the Internet) are captured. These packets may be destined for the gateway itself, in which case the state machine makes a transition from the INIT to DONE state. Otherwise, a packet may be destined for an internal machine, in which case the gateway will first receive it on its external network interface, and make a transition from the INIT to PKT_RCVD state. The state machine will relay the packet on its internal network interface, making a transition to the DONE state. Occasionally, the relay may not take place. This may be due to a variety of reasons, including (a) the gateway could not resolve the MAC address corresponding to the IP address of the target machine, (b) the gateway machine is malfunctioning, etc. These situations can be modeled with a timeout transition from the PKT_RCVD state to the DONE state.

As shown in FIG. 3, specifications are based on extended finite state automata (EFSA). An EFSA is similar to a finite-state automaton, with the following differences: an EFSA makes transitions on events that can have arguments, and it can use a finite set of state variables in which values can be stored. The pkt event denotes the reception or transmission of a packet. A first argument of pkt identifies the network interface on which the packet was received or transmitted. A second argument of pkt captures the packet contents. The timeout event denotes a time out transition, which will be taken if no other transitions are taken out of a state for a predefined period of time. The IP state machine uses state variables such as src and dst. These variables are used to store the source and destination IP addresses seen in a packet arriving on the gateway's external interface. By using these state variables, the state machine can match a packet received on the external interface with a corresponding packet (when it is relayed) on the internal interface.

To understand how such EFSA specifications can be used for monitoring protocol behavior, consider the IP state machine again. For each IP packet received on the external network interface, an instance of the IP state machine can be created that is in the INIT state, and this instance can be added to the list of active IP machine instances. The packet can be given to every IP state machine instance in the list of active IP machine instances, and each instance that can make a transition on this packet is permitted to do so. Any state machine that reaches the DONE state is deleted from the list. Thus, when monitoring protocol behavior, many instances of the state machine can be created, each instance tracing a path in the EFSA from the INIT to the DONE state. A trace can be characterized by a sequence of states, where "state" includes the control state of the automata (e.g., DONE, PKT_RCVD and DONE) and the values of state variables such as src and dst.

The statistical machine learning can be superimposed over this specification. Note that the EFSA specifications implicitly map the statistical properties of the IP packet stream to properties of traces accepted by the EFSA specifications. Thus, the statistical properties of the IP packet stream can be characterized in terms of:

the frequency (across traces) with which a particular transition in the EFSA is taken, e.g., the frequency with which the timeout transition is taken the most commonly encountered value of a state variable at a particular control state of the EFSA, e.g., the most common value for the dst state variable at the PKT_RCVD state. (This value would correspond to the IP address to which maximum number of IP packets are received from the Internet.)

the distribution of values of a state variable, e.g., how frequently does the protocol field (in the IP header) have the value TCP, UDP, etc.

In addition, statistical properties across a subset of traces can be incorporated, rather than all traces. The traces of interest can be specified on the basis of state variable values. For example, the number of IP-packets being relayed by the gateway to a particular local machine M can be specified by selecting traces that have dst equal to M in their PKT_RCVD state, and identifying the number of times the transition from PKT_RCVD to DONE was taken in these traces. A second, orthogonal way to select a subset of traces is based on time: for example, in traces that were observed within the last T seconds.

Based on learning statistical properties associated with the IP-state machine, several kinds of attacks can be detected. For example, for detection of an IPsweep attack, an IDS needs to incorporate knowledge about IPsweeps at some level. If a particular statistic is designed that specifically targets IPsweep, e.g., the number of different IP addresses for which packets were received in the last t seconds for some suitably small value of t, then the attacks can be detected accurately, based on anomalies in this statistic. In contrast, according to an embodiment of the present invention, no knowledge about IPsweeps is encoded. Nevertheless, the attacks can be detected as follows. Since an IPsweep attack is designed to identify the IP addresses in use on a target network, the attacker does not know legitimate IP addresses in the target domain at the time of attack. This implies that several packets will be sent by the attacker to nonexistent hosts. This would result in a sudden spurt of timeout transitions being taken in the IP state machine. Thus, the statistics on the frequency of timeout transitions from the PKT_RCVD state can serve as a reliable indicator of the IPsweep attack.

As mentioned earlier, network protocols can be modeled using extended finite state automata (EFSA), which augment traditional FSA with a set of state variables. Formally, an EFSA M is a septuple, $(\Sigma, Q, s, f, V, D, \delta)$ where:

$\Sigma$ is the alphabet of the EFSA. It is an event alphabet, e.g., elements of $\Sigma$ are characterized by an event name and event arguments.

Q is a finite set of states, also called as control states, of the EFSA $s \in Q$ is the start state of the EFSA $f \in Q$ is the final state, wherein f is a sink state, e.g., a state that has no outward transitions.

V is a finite tuple $(v_1, \ldots, v_n)$ of state variables.

D is a finite tuple $(D_1, \ldots, D_n)$, where $D_i$ denotes the domain of values for the variable $v_i$.

$\delta: Q \times D \times \Sigma \rightarrow (Q, D)$ is the transition relation.

Below, an example of a language for specifying EFSA that model network protocols is described.

State machines specifications follow the EFSA definition given above. The set $\Sigma$ (events) are specified over an interface in terms of names, arguments, and types. The set D is also indirectly specified. The following declarations specify four other components Q, s, f, and V.

The (control) states of a state machine may be declared using states $\{s_1, \ldots, s_n\}$, where $s_1, \ldots, s_n$ denote the states of the state-machine.

The start state of the state machine can be specified using the declaration startstate s.

The final state of the state machine can be specified using the declaration finalstate f.

Other state variables can be declared and used within a state machine description.

The transition relation $\delta$ is specified using rules of the following form:

$e(x_1, \ldots, x_n)|cond \rightarrow action$

Here e is an event name, and the variables $x_1, \ldots, x_n$ denote the arguments of this event. The expression cond should evaluate to a boolean value, and can make use of common arithmetic and relational operators. It involves the variables in V, the event arguments, and the distinguished variable state that refers to the current control state of the EFSA. The action component comprises actions that will be taken when the event e occurs, and cond evaluates to true. Allowable actions include assignments to state variables (e.g., variables in V) and invocations of external functions. The action must also include an assignment to state.

In general, protocol state machines are non-deterministic. Non-determinism can be simulated by cloning k copies of the state machine whenever it can make one of k different transitions. (The cloning operation duplicates not only the control state, but also all of the state variables.) The number of state machine instances cannot increase forever. To deal with this problem, state machine instances that reach a final state can be automatically deleted. Note that final states are somewhat different from "accepting states" of an FSA—they are similar to "sink" states from which no progress can be made.

There can be many instances of a state machine at runtime. Thus, for each incoming event, all of the state machine instances need to be searched to discover those that can make a transition. This operation can be optimized for situations that occur frequently. The optimization can be, for example, one state machine instance implemented to track a "session", wherein the session to which an event applies can be determined from the event parameters. The following language construct can be used to specify such mapping:

map event(eventArgs) when condition

Here event can be a primitive or an abstract event that is defined without the use of any conditions. The condition component can be of a special form: a conjunction of equality tests, where the lefthand side of the test is an expression on eventArgs and the right-hand side is a state variable. This restriction is imposed so that the identification of the right state machine instance can be implemented using a hash-table lookup.

The state machine description language also permits timeout transitions to be described. Timeouts values can be declared using one or more declarations of the form:

timeout t in $\{s_1, \ldots, s_m\}$

This declaration states that a state machine will stay in one of the states $s_1, \ldots, s_m$ for at most t seconds. At the end of this period, a transition associated with the special event timeout will be taken.

The specification of the IP state machine shown in FIG. 2 can be given as:

```
event tx(int interfaceId, ether_hdr data);
event rx(int interfaceId, ether_hdr data);
StateMachine ip_in(int in, int ext, IPaddr in_ip, IPaddr ext_ip) {
    /* in and ext refer to internal and external interfaces. */
    /* The corresponding IP addresses are in_ip and ext_ip */
    states {INIT, PKT_RCVD, DONE};
    startstate INIT;
    finalstate DONE;
    IPaddr src, dst; /* state variables */
    timeout 60 seconds {PKT_RCVD};
    map rx(ifc, pkt) when (ifc == ext);
    map tx(ifc, pkt) when (ifc == in) && (pkt.ipsrc == src) &&
        (pkt.ipdst == dst);
    rx(ifc, pkt)|(ifc == ext) && (state == INIT) && (pkt.ipdst != in_ip)
        && (pkt.ipdst != ext_ip) --> state = PKT_RCVD; src =
        pkt.ipsrc; dst = pkt.ipdst;
    rx(ifc, pkt)|(ifc == ext) && (state == INIT)
        && ((pkt.ipdst == in_ip) || (pkt.ipdst == ext_ip)) --> state =
        DONE;
    tx(ifc, pkt)|(ifc == in) && (state == PKT_RCVD) --> state =
        DONE;
    timeout|(state == PKT_RCVD) --> state = DONE;
}
```

Unlike software in general, network protocols are designed through a careful and deliberate process. The design is captured in a precise fashion in standards documents. Such documents can provide a starting point for a state machine specification.

This specification can be abstracted to capture only the essential details of most protocols. Such information may be readily obtained from standard texts on network protocols rather than (the much longer) Internet RFCs. While strict adherence to protocol standards documents is possible, this may not be desirable. For example, developing precise specifications can entail more effort than that needed for more abstract specifications. Further, with strict specifications, there is always the possibility that due to minor difference in interpretation, some legitimate traffic can be classified as invalid by the state machine, and hence not processed properly. In addition, such incorrect processing can happen with some TCP implementations and not others. Using a more abstract specification, where the state machines accept a superset of what is permitted by the standards, provides a satisfactory solution to these problem.

Figure 4:
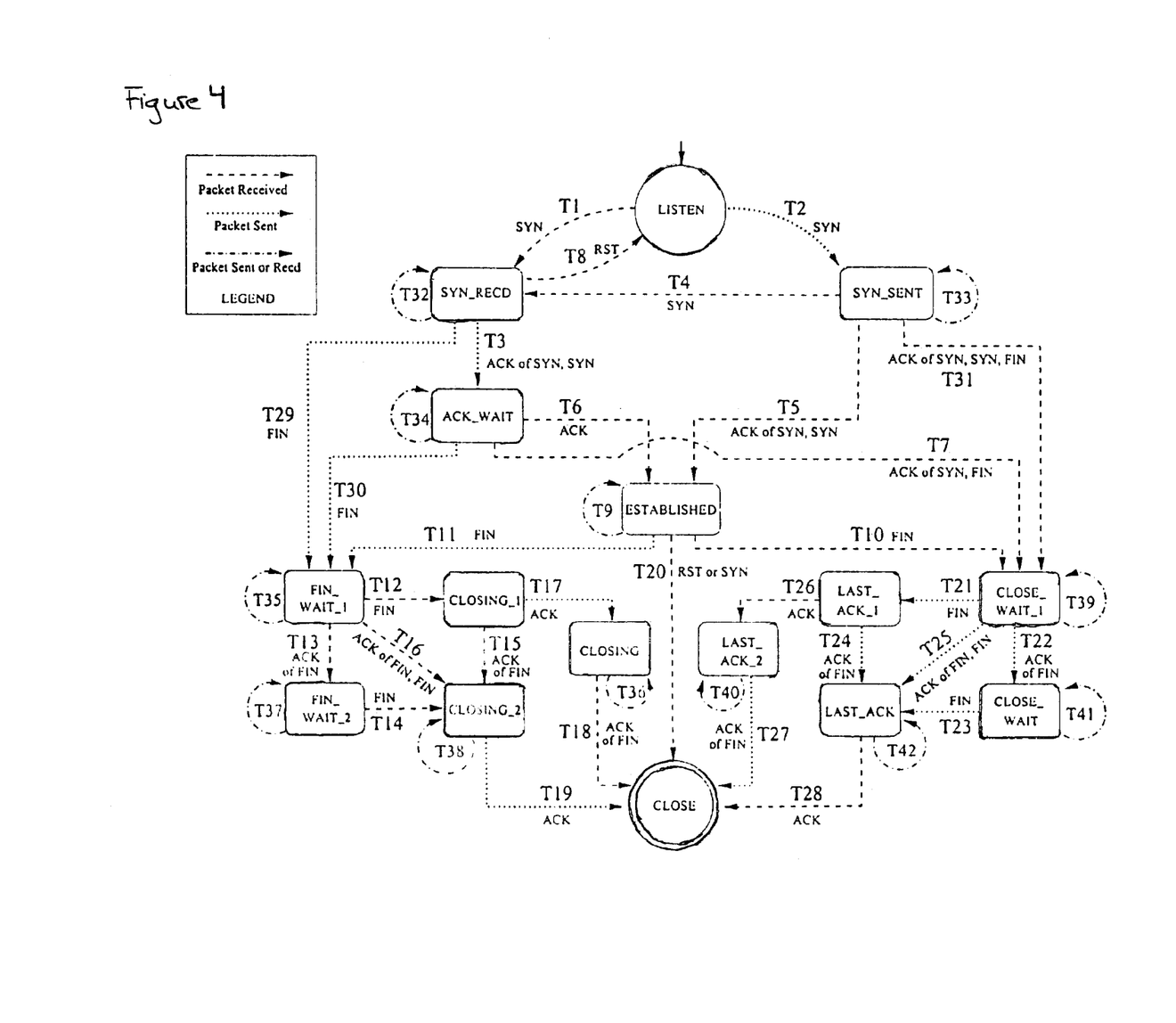
FIG. 4 is a diagram of a TCP protocol state machine according to an embodiment of the present invention.

A specification of the TCP state machine, as observed on a gateway connecting an organization's internal network to the Internet, is given in FIG. 4. A new session starts in the LISTEN state. Data transfer takes place in the (connection) ESTABLISHED state. If the TCP connection is initiated from an external site, then the state machine goes through SYN_RECD and ACK_WAIT states to reach the ESTABLISHED state. If the connection is initiated from an internal machine, then the ESTABLISHED state is reached through the SYN_SENT state.

To tear down the connection, either side can send a TCP segment with the FIN bit set. If the FIN packet is sent by an internal host, the state machine waits for an ACK of FIN to come in from the outside. Data can continue to be received until this ACK to the FIN is received. It is also possible that the external site can initiate a closing of the TCP connection. In this case a FIN, or a FIN+ACK can be received from the external site. This scenario is represented by the states FIN_WAIT_1, FIN_WAIT_2, CLOSING, CLOSING_1 and CLOSING_2 states. The state machine characterizes receive and transmit events separately, and this necessitates additional intermediate states that are not identified in the TCP RFCs.

If the connection termination is initiated by an external host, note that the TCP RFCs do not have the states CLOSE_WAIT_1, CLOSE_WAIT_2, LAST_ACK_1, and LAST_ACK_2 since they deal with packets observed at one of the ends of the connection. In that case, it is reasonable to assume that no packets will be sent by a TCP stack implementation after it receives a FIN from the other end. According to an embodiment of the present invention, traffic can be observed at an intermediate node (gateway), so the tear down process is similar regardless of which end initiated the tear down.

To reduce clutter, the following classes of abnormal transitions are not shown: (a) abnormal conditions under which a TCP connection may be terminated, including when an RST packet (with correct sequence number) is sent by either end of the connection, as well as timeouts, (b) conditions where an abnormal packet is discarded without a state transition, e.g., packets received without correct sequence numbers (after connection establishment) and packets with incorrect flag settings.

Information sources such as network packets pose a significant challenge for anomaly detection techniques for two reasons. For example, the volume of data, and consequently, the space of possible statistical properties of interest, is large. In addition, raw network packet data tends to be unstructured, making it difficult to identify meaningful information from "background noise." To deal with this problem, the raw packet data can be processed to extract important "features" that are deemed to be of interest. This process can reduce the amount of data to be processed by an anomaly detection system. Moreover, it identifies important information from the packet streams, while discarding less useful information.

The importance of feature selection is acknowledged by most researchers in anomaly detection. Currently, feature selection is driven by human expert's knowledge and judgement regarding what constitutes "useful information" for detecting attacks. While human experts are often in a position to identify some useful features, it is far from clear that they can do a comprehensive job. Often, their notion of a useful feature is influenced by their knowledge of known attacks. Consequently, they may not necessarily select features that are useful in detecting unknown attacks.

According to an embodiment of the present invention, a higher degree of automation and completeness are brought to the process of feature selection. Specifically, properties of packet sequences are mapped into properties associated with the transitions of the state machine. This enables mapping of statistical properties of packet sequences into statistical properties associated with transitions. Since the number of transitions is relatively small as compared to the number of possible combinations of network packets, the space of possible features can be reduced.

Regarding the mapping of packet sequence properties of state-machine transitions, specifications transform properties of network packets into traces, where each trace corresponds to a path in the state machine. For instance, the IP state machine described above partitions the sequence of packets received at the external interface of the gateway or transmitted at the internal interface into one of the following kinds of traces:

rx(ext, pkt) where pkt is destined for the gateway rx(ext, pkt1) tx(int, pkt2) where pkt2 is a packet that is relayed by the gateway in response to receiving pkt1 rx(ext, pkt1) timeout, where a packet is received by the gateway with destination address other than that of the gateway, but the packet is not relayed by the gateway (usually due to a packet error, such as invalid IP address, or a gateway error/failure)

This partitioning introduces structure into what would otherwise be an unstructured, long sequence of packets. It also reduces the space of possible properties of interest, since a trace, being fairly short, has much fewer properties than that of extremely long packet sequences. In addition to reducing the space of possible properties, the transitions in the state machine specifications provide concrete clues on what properties may be of interest. For instance, some transitions represent unexpected packets, which usually occur due to network failures or an attack. Similarly, absence of expected packets, and the consequent transition on a timeout event, suggests a failure or an attack. For this reason, properties related to individual transitions are utilized. These properties can be categorized as follows:

Type 1: whether a particular transition on the state machine is taken by a trace. (Example: is the timeout transition taken by a trace?)

Type 2: the value of a particular state variable or a packet field when a transition is traversed by a trace. For example: to determine the size of IP packet when the transition from INIT to PKT_RCVD state is taken.

More complex properties that involve multiple transitions, e.g., whether a trace traverses a particular combination of transitions, can also be captured. This can be accomplished by augmenting the original specification with an auxiliary state variable that would be set if a trace traversed the desired combination of transitions. The original property reduces to a simple state transition property—specifically, that of taking the last of the transitions under the condition that the auxiliary state variable is set.

For learning statistical properties using anomaly detection for determining "unusual behaviors", the state machine models map behaviors to transitions of the state machine. Thus, unusual behaviors can be detected if the system or method knows or learns how frequently a transition is taken (for type 1 properties), or the commonly encountered values of state variables on a transition (for type 2 properties). One way to represent this information is as an average, e.g., the average frequency with which a transition is taken. However, it is well-known that network phenomena tend to be highly bursty, and hence averages do not provide an adequate way to characterize such phenomena. Therefore, according to an embodiment of the present invention, distributions are captured rather than averages. For type 1 properties, frequency distributions can be maintained, whereas for type 2 property, the distribution of values for the state variable of interest can be maintained.

The representation of distributions is different, depending on the nature of the values in the distribution. If the values are categorical, then a distribution counts the number of times each distinct value occurs in the distribution. For instance, if the value is an IP address, then the distribution represents the number of occurrences of each IP address. If the number of possible categories becomes too large, for example, above a threshold, the distribution can represent only those categories that occur most frequently. If the values represent a scalar quantity such as a packet size, then the distribution can be represented compactly using a histogram. Since frequencies represent a scalar quantity, frequency distributions can also be represented using histograms.

For properties that hold across a subset of traces, traces of interest can be selected based on recency, e.g., traces witnessed during the last seconds. Another way to select traces is based on values of state variables or packet fields. For example, traces corresponding to fragmented packets or traces involving packets from a particular host and/or to a particular host.

Statistical properties to be learnt can be specified conveniently in the state machine description language as follows. For instance, the statement:

on all frequency timescale (0.001, 0.02, 0.5, 10, 100, 1000)

indicates that frequency distribution information can be learnt on all transitions, and that six different distributions should be maintained. The time scales corresponding to these distributions range from 1 millisecond to 1000 seconds. A timescale specifies the period over which the number of times a transition is taken is determined. Use of short time scales enables faster attack detection. However, since network phenomena tend to be more bursty at shorter time scales, slow attacks tend to be missed at shorter time scales. They can be detected by observing statistics over larger time scales, but those time scales imply longer latencies before attack detection. By using a range of time scales, the benefits of fast detection of rapidly progressing attacks can be combined with delayed (but more certain) detection of slower attacks.

The following statement indicates that a frequency distribution on a per-source-host basis is to be maintained. Since the number of possible source hosts can be large, the language allows the use of size declarations to bound the storage requirements. For example, a bound of 100 is declared in the following statement. Thus, if more than 100 source hosts are active at any time, then only the most active of these hosts will be retained in the table, and the others would be purged. The notion of "most active" incorporates aging, so that hosts that were active in the past but have become inactive for a long period (e.g., relative to the timescale) since, will be discarded from the table. Recall that src is the name of a state variable in the IP state machine specification.

on all frequency wrt (src) size 100 [wrt(..) size.. [wrt(..) size..]..]

timescale (0.001, 0.02, 0.5, 10, 100, 1000)

The keyword value is used in place of frequency to indicate value distributions, as opposed to frequency distributions. This allows a method to monitor specific ranges of values a state variable can take. In a similar way, the monitoring can be restricted to a specific subset of transitions by listing their labels, instead of the key word "all."

During a detection phase, the statistics specified for learning are determined again, and compared with the values learnt during the training phase. If the statistics vary substantially from what was learnt, then an anomaly is raised.

A thresholding scheme can be applied to distribution data maintained as histograms (e.g., frequency distributions and distribution of values of scalar parameters). For a parameter p, let $t_p$ denote the highest histogram bin with nonzero count during training, and $d_p$ denotes the corresponding number during detection phase, then an anomaly will be flagged if $t_d-t_p$ exceeds a threshold. While the threshold could be explicitly specified, to simplify things further as follows. Geometric ranges can be used for histogram bins, e.g., successive bins may correspond to values. The threshold can be set to a fixed value such as 1 or 2. For experimental data provided herein a threshold of 1 has implemented.

The effectiveness of the present invention can be tested using 1999 DARPA/Lincoln Labs evaluation data. The evaluation organizers set up a dedicated network to conduct a variety of attacks. Care was taken to ensure that the distribution of traffic in terms of different protocols and services was similar to that seen at a large organization. All of the network traffic was recorded in tcpdump format and provided to the participants of the evaluation. The data provided consisted of training data, plus two weeks of test data. The uncompressed size of the tcpdump files was approximately 700 MB per day.

Experiments with the present invention studied attacks on lower layers of protocols such as IP and TCP. Such attacks correspond to the probing and denial-of-service (DoS) attacks in the Lincoln Labs data, with one exception: since the present invention recognizes anomalies based on repetition, at least two packets need to be involved in an attack before the attack can be expected to be detected. This eliminates the following attacks from consideration: arppoison (poisoning of an ARP cache by providing wrong address resolution information), crashiis (a malformed packet that causes Microsoft IIS server to crash), dosnuke (another malformed packet that crashes Microsoft Windows), syslogd (single packet to syslogd that causes it to crash), land (single TCP syn packet with source and destination being equal), and teardrop (overlapping IP fragment with bad offset value—needs two packets, but the attack itself is present only in the second one). Note, however, that other short-sequence attacks such as ping-of-death and 3-packet. portsweeps are still within the scope of the experiment. Also eliminated from consideration are certain attack instances (but not attack types) that are present exclusively on the "inside tcpdump" data, since the TCP state machine model was developed for the "outside tcpdump" data that records the traffic observed on the external network interface of the gateway host. Finally, various attack instances were excluded where the tcpdump data provided by Lincoln Labs was corrupted around the time of attack. Table 1 summarizes the results on the rest of the attacks.

TABLE 1

| Attack Name | Attacks Present | Attacks Detected | Description |
| --- | --- | --- | --- |
| Apacke2 | 2 | 2 | Dos attack on Apache web server |
| Back | 3 | 3 | Dos attach on Apache web server |
| IP Sweep | 6 | 6 | Probe to identify potential victims |
| Mailbomb | 3 | 3 | Large volume of mail to a server |
| Mscan | 1 | 1 | Attack tool |
| Neptune | 3 | 3 | AYN-flood attach |
| Ping-of-Death | 4 | 4 | Over-sized ping packets |
| Smurf | 3 | 3 | ICMP echo-reply flood |
| Queso | 3 | 3 | Stealthy probe to identify victim OS |
| Satan | 2 | 2 | Attack tool |
| Portsweep | 13 | 13 | Probing to identify exploitable servers |
| Total | 43 | 43 | |

All of the attacks within the scope of the prototype were detected. Particularly note worthy was the detection of some stealthy portsweep attacks, some of which involved just 3 probe packets, each from a different source host!

Another interesting aspect is that any sweeps were detected at all. Many anomaly detection systems incorporate knowledge into their system about such sweeps, and are explicitly programmed to look for anomalies such as "accessing so many ports within a certain period of time." In contrast, according to an embodiment of the present invention, no knowledge about sweeps is encoded. Nevertheless, it is able to detect sweeps, typically because of increased frequency of occurrence of certain abnormal transitions in the protocol state machines (e.g., the timeout transition in the IP state machine.)

The present invention generated, on the average, 5.5 false alarms per day. This is at the low end of the false alarm rates reported in the 1999 evaluation, even when misuse based approaches are taken into consideration.

No systematic performance tuning has been attempted in the prototype implementation, and hence our performance results are to be treated as preliminary. Currently, the system implemented in the experiment can process an entire day's data within ten minutes (excluding I/O time) while running on a 700 Mhz Pentium III processor with 1 GB memory.

A simplified version of the IP state machine was presented earlier in this application. The version used in the experiment differs from this version in two ways: it handles packets originating from internal hosts in addition to packets originating from external hosts and it handles IP fragmentation. Specifically, it treats a sequence of IP fragments that are part of the same IP packet as a single trace. In contrast, the simplified version treats each fragment as if it is independent of other fragments.

The statistics learnt by the IP state machine is captured by the following specification:

[1] on all frequency timescale (0.001, 0.01, 0.1, 1, 10, 100 and 1000)

[2] on all frequency wrt (src) size 100 timescale . . .

[3] on all frequency wrt (dst) size 100 timescale . . .

[4] on all frequency wrt (src, dst) size 100 timescale . . .

The time scales for [2] through [4] are identical to that of [1]. Not all of these statistics were necessary for detecting the attacks in the Lincoln Labs data. However, one cannot easily predict in advance which of these parameters were necessary. Since the present invention is to be "mindless" about the choice of parameters, the above set of statistics were selected for learning.

Based on these statistics, the following attacks are detected by the IP state machine:

IP Sweep: As mentioned earlier, IP sweeps manifest as a spurt in the frequency with which timeout transitions are taken in the IP state machine. Since the sweep is usually conducted by a single source machine, it is most obvious with statistic [2] above. Sweeps that involve a significant number of destination hosts also raise an anomaly in statistic [1].

Ping of Death: A ping of death attack typically involves a large number of fragmented IP packets. Thus, it manifests a spurt in the frequency of transitions that are taken when fragmented packets are received. The spurt is most noticeable when we consider a single destination, i.e., statistic [3]. It is also noticeable when source destination pairs are consider, as with statistic [4], and also with statistic [2].

Smurf: This is a flooding attack involving the reception of a very large number of packets. As one can expect with such attacks, we witness an anomaly with almost every statistic mentioned above, but the most anomalous statistics correspond to [1] and [3].

A higher level system merges alarms that are temporally close together into a single alarm. While a sophisticated approach for such alarm aggregation can be implemented for attacked identification, for the purpose of experimentation, a simple approach was used: combine alarm reports that are spaced less than a few minutes apart.

The statistics monitored by the TCP state machine is given by the following statements or rules, where the time scale information is left out to avoid repetition. (Time scales remain exactly the same as with IP machine.)

[5] on all frequency timescale . . .

[6] on all frequency wrt (ext_ip) size 1000 timescale . . .

[7] on all frequency wrt (int_ip) size 1000 timescale . . .

[8] on all frequency wrt (ext_ip, int_ip) size 1000 timescale . . .

[9] on all frequency wrt (int_ip, int_port) size 1000 timescale . . .

[10] on all frequency wrt (ext_ip, int_ip, int_port) size 1000 timescale . . .

[11] on all frequency wrt (ext_ip, ext_port, int_ip, int_port) size 1000 timescale . . .

Here ext ip and ext port refer to IP address and port information on the external network (Internet), while int ip and int port refer to address and port information on the internal network. Some combinations such as (ext ip, ext port, int ip) are left out under the assumption that the traffic destined for local servers is more important, in which case the remote port information is not useful.

Portsweep: In this attack, an attacker attempts to probe for services running on a victim host by systematically attempting to access all ports. This leads to a large number of connection attempts seen at a victim host. Thus, anomalies are detected on the transitions T32 and T44 of the TCP state machine, on statistics given by [7] and [8] above, if the connection attempt is a normal attempt. If the scan involves reset packets or other unusual packets, then anomalies occur in the transition from the LISTEN state to itself, which is T49 (not shown in the diagram). It is interesting to note that the present invention can detect portsweeps that includes 3 packets originating from 2 or 3 different hosts.

Queso: Queso is a utility program which is used to determine which operating system that is running at a certain IP address. Queso sends a series of 7 TCP packets to any one port of a machine and uses the return packets it receives to lookup the machine in a database of responses. These packets usually have unusual combinations of the TCP flags, and arrive when unexpected. Thus, a spurt can be identified in packets in the transition from LISTEN state to itself.

Neptune (SYN Flood): In this attack, an external host, usually using a spoofed address, sends a SYN packet to a server, thereby initiating a connection. But the attacker never responds to the SYN-ACK packet from the server. This leads to a situation known as "half-open" TCP connections on the server. Since such connections use up resources, TCP implementations limit the number of half-open connections. If this limit is exceeded, the server refuses subsequent connection requests. According to an embodiment of the present invention, a spurt can be identified in the frequency of timeout transitions from the half-open state. This happens on statistics [6], [7], [8], [9], [10] and [11]. (If the attacker changes the (spoofed) source address quickly, then the attack can be obscured on any statistics that includes the external IP address, but it will still be detected by [7] and [9].)

Satan/Saint: SAINT is the Security Administrator's Integrated Network Tool, which probes for common vulnerabilities in services that are used most frequently. The probes generate anomalies similar to those seen with port sweeps.

Mscan: Mscan is a tool used to enumerate the systems on a network via DNS zone transfer requests, IP address scanning, etc. This attack too generates anomalies similar to port sweeps.

Mailbomb: A Mailbomb is an attack where the victim's resources are overloaded by sending exorbitant number of emails to a server, overflowing that server's mail queue and possibly causing system failure. Excessive traffic to the mail server leads to anomalies in [7], [8], [9], [10] and [11].

Apache2: This is a DOS attack that can cause an Apache web server to use disproportionate amounts of memory and CPU time by sending a large number of MIME headers with the same name. The large size of the http headers causes an increase in the frequency with which packets are received in the ESTABLISHED state of the TCP machine. The anomaly is most pronounced in the case of [10] and [9].

Back: In this denial of service attack against the Apache web server, an attacker submits requests with URL's containing many slashes. As the server tries to process these requests it will slow down. Due to its similarity with Apache2, it is detected in the same manner.

To demonstrate the applicability of the present invention to problems other than network intrusion detection, an experiment involving email virus detection was conducted. In these experiments, the state machine model can be applied as observed at the mail server for the intranet (See FIG. 5.). The state machine has three states. It moves from the INIT state to RCVD state on the event send. This event models the action of an email client, which connects to the mail server and deposits mail. Arguments to this event are the sender, a message identifier, and the recipients. The mail is subsequently delivered to all the recipients, and this action is modeled by the event deliver. Note that since there is one copy of mail delivered to each recipient, and hence the deliver event has only one recipient argument, unlike the send event.

Figure 5:
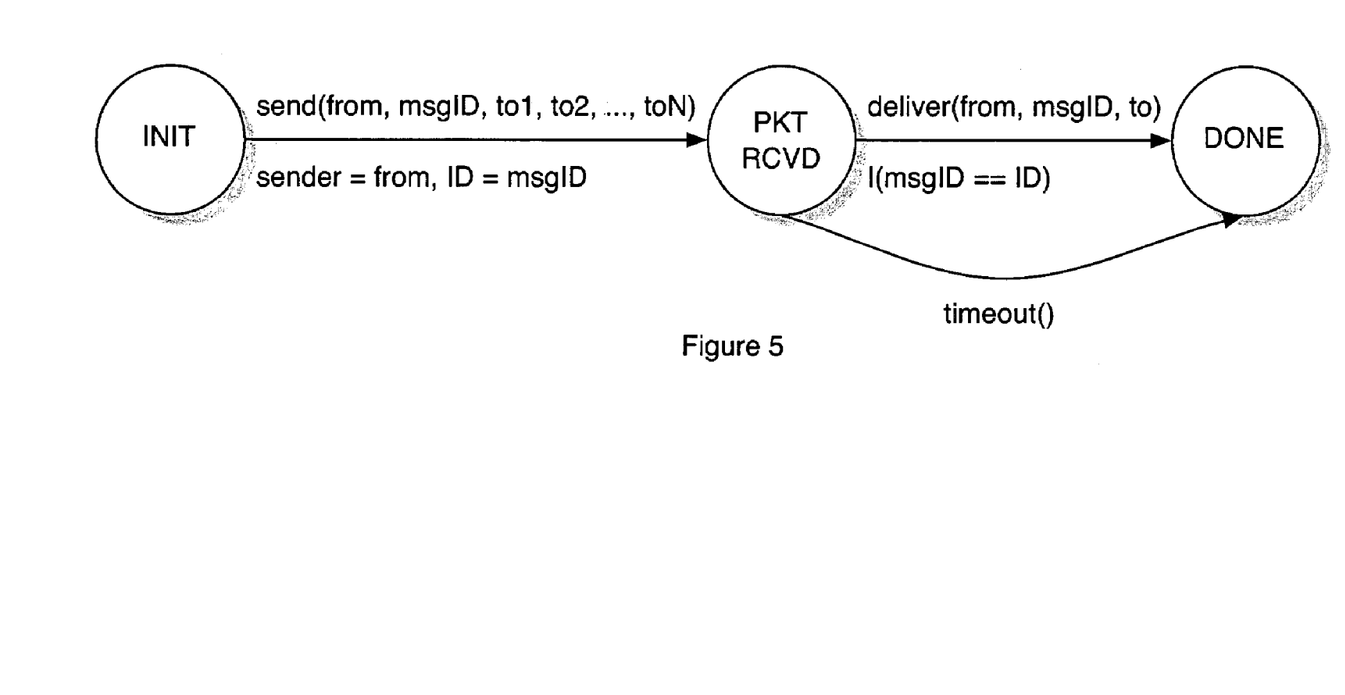
FIG. 5 is a diagram of an email virus detection state machine according to an embodiment of the present invention.

The statistical properties can again be specified in BMSL as follows.

[1] on all frequency timescale (10, 30, 120, 500, 2000, 8000, 25000)

[2] on all frequency wrt (sender) timescale . . .

The present invention was applied to DARPA's SARA experiment. In this experiment, a test network was set up with 400 email clients and one sendmail server. Normal email traffic was simulated using "bots" that capture typical user behavior that relates to email reading/replying/deleting etc. A variety of simple to highly sophisticated viruses were introduced, and various defense mechanisms were tested in terms of their ability to stop virus propagation. The experiment used a variety of detectors, many of which are misuse detectors that capture such aspects as excessive rate of email generation etc. Since "sneaky" viruses can evade such detectors, an anomaly detector can be deployed.

Due to the way the experiment was structured, no good response actions could be launched in response to attack reports from the anomaly detectors. The only possible option was to shut down a large number of clients and/or the email server. Since this is a drastic response, a large delay was introduced into the detection by anomaly detector, so that other detectors were able to try to control the virus before drastic actions were attempted. Specifically, the anomaly detector was tuned to detect attacks only at a point where other defensive mechanisms were unable to stop the virus, and thus, the virus was out of control.

The experiments involved hundreds of runs involving about ten different virus types, ranging from very simple viruses to very sophisticated ones. Of these, there were only seven runs where the virus was not checked by other defense mechanisms. Since the anomaly detector was tuned to detect only such cases, its performance in those seven runs is shown in FIG. 5. Note again that the present invention was able to detect the virus in each one of these seven runs. In addition, there were no false alarms. (Very low false alarm rate is to be expected, given that the anomaly detector was tuned to delay detection.)

The present invention is applicable for problems beyond network intrusion detection. For example, it is applicable to the related domain of host-based intrusion detection, where anomalies in behaviors of applications and users are detected. Further, the system and method is applicable to the broader problem of application specific anomaly and attack detection. Another example of an application suited to the present invention is the monitoring of behaviors of networks of computers and systems for the purpose of detecting anomalies that result either due to attacks or due to system malfunction, for example, due to internal and external faults.

Having described embodiments for a specification-based anomaly detection method for network intrusion detection, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for network intrusion detection on a network comprising a state machines for processing a plurality of network packets comprising the steps of:
   determining a state-machine specification for at least one network protocol of interest;
   determining at least one statistical property of interest corresponding to a transform performed by the state-machine;
   determining, in a training mode, statistics corresponding to the at least one statistical property of interest;
   initializing a detection mode with the statistics corresponding to the at least one statistical property of interest;
   determining observed statistics corresponding to the at least one statistical property of interest in the detection mode according to network packets processed by the state-machines; and
   comparing the at least one statistical property of interest to the observed statistics corresponding to the at least one statistical property of interest determined in detection mode, and upon determining a significant deviation generating an alarm.

2. The method of claim 1, further comprising storing statistics corresponding to the at least one statistical property of interest determined in training mode.

3. The method of claim 1, wherein the at least one network protocol of interest is one of IP, TCP, and HTTP.

4. The method of claim 1, wherein the at least one statistical property of interest is a frequency distribution with which a transition is taken.

5. The method of claim 1, wherein the at least one statistical property of interest is a distribution of a value of at least one state variable.

6. The method of claim 1, wherein the alarm further comprises at least one packet field of the network packet and state machine contents.

7. The method of claim 1, further comprising the steps of:
   determining a source of an attack, wherein the attack triggered the alarm;
   determining a destination of the attack; and
   determining a type of the attack.

8. The method of claim 1, wherein the at least one statistical property of interest is one of whether a particular transition on the state machine is taken by the trace and the value of the particular state variable or a packet filed when a transition is traversed by a trace.

9. The method of claim 1, wherein the state-machine specification is rule based.

10. A method for network intrusion detection on a network comprising a plurality of state machines for passing a plurality of network packets comprising the steps of:
    determining frequency distributions for each transition within each state machine;
    determining the distributions of values of each state machine on each transition; and
    comparing the distributions to observed statistics in the network, and upon determining that the observed statistics are outside defined limits, detecting an anomaly.

11. A program storage device readable by machine, tangibly embodying a program of instructions executable by the machine to perform method steps for for network intrusion detection on a network comprising a plurality of state machines for passing a plurality of network packets, the method steps comprising:
    determining frequency distributions for each transition within each state machine;
    determining the distributions of values of each state machine on each transition; and
    comparing the distributions to observed statistics in the network, and upon determining that the observed statistics are outside defined limits, detecting an anomaly.

12. The method of claim 10, wherein comparing the distributions comprises augmenting the state machine with anomaly detection based on the distributions.

13. The method of claim 11, wherein comparing the distributions comprises augmenting the state machine with anomaly detection based on the distributions.

* * * * *